US012571761B2

(12) United States Patent
Sick et al.

(10) Patent No.: US 12,571,761 B2
(45) Date of Patent: Mar. 10, 2026

(54) ELECTROCHEMICAL SENSOR INCLUDING A MEASURING CELL AND AN OXIDATION COMPONENT AND PROCESS USING SUCH A SENSOR

(71) Applicant: Dräger Safety AG & Co. KGaA, Lübeck (DE)

(72) Inventors: Michael Sick, Lübeck (DE); Rolf Eckhardt, Lübeck (DE); Christopher Wolter, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 282 days.

(21) Appl. No.: 18/310,586

(22) Filed: May 2, 2023

(65) Prior Publication Data

US 2023/0358703 A1 Nov. 9, 2023

(30) Foreign Application Priority Data

May 6, 2022 (DE) ..................... 10 2022 111 351.5

(51) Int. Cl.
G01N 27/404 (2006.01)
G01N 27/30 (2006.01)
(52) U.S. Cl.
CPC ......... *G01N 27/404* (2013.01); *G01N 27/301* (2013.01)
(58) Field of Classification Search
CPC . G01N 27/404; G01N 27/301; G01N 27/4045
See application file for complete search history.

(56) References Cited

U.S. PATENT DOCUMENTS 3,328,277 A * 6/1967 Solomons ............ G01N 27/404
204/415
4,435,268 A * 3/1984 Martin ................. G01N 27/404
204/415
(Continued)

FOREIGN PATENT DOCUMENTS

DE 3203362 A1 9/1982
DE 4231256 A1 3/1994
(Continued)

OTHER PUBLICATIONS

JPO machine-generated English language translation of JP 59003345 A, patent published Jan. 10, 1984 (Year: 1984).*
(Continued)

*Primary Examiner* — Alexander S Noguerola
(74) *Attorney, Agent, or Firm* — McGlew and Tuttle, P.C.

(57) ABSTRACT

An electrochemical sensor (100) is capable of detecting a gas component in a gas (G). A process uses such a sensor (100). The gas (G) flows through an inlet (Ö) on the measuring cell side in a housing (10) to a measuring cell (2, 4, 12, 15). A chemical reaction takes place at the measuring cell (2, 4, 12, 15), which depends on the concentration of the gas component and influences a measurable electrical quantity. An electrical measuring unit (15) measures this electrical quantity. Gas can also pass through a pressure equalizing outlet (16) into the housing (10). An oxidation component (6) between the pressure equalizing outlet (16) and the measuring cell (2, 4, 12, 15) oxidizes an oxidizable gas component in this gas.

20 Claims, 3 Drawing Sheets

(56) References Cited

U.S. PATENT DOCUMENTS

| | | | | |
|---|---|---|---|---|
| 5,690,808 A | * | 11/1997 | Akmal | G01N 27/404 |
| | | | | 205/785.5 |
| 5,997,706 A | | 12/1999 | Kiesele et al. | |
| 2003/0010635 A1 | * | 1/2003 | Kiesele | G01N 33/0009 |
| | | | | 204/415 |
| 2003/0029721 A1 | | 2/2003 | Broy et al. | |
| 2005/0034987 A1 | * | 2/2005 | Zhou | G01N 27/4073 |
| | | | | 205/785.5 |
| 2006/0124458 A1 | * | 6/2006 | Nauber | G01N 27/404 |
| | | | | 204/431 |
| 2009/0057150 A1 | * | 3/2009 | Millar | G01N 27/404 |
| | | | | 204/432 |
| 2019/0227025 A1 | | 7/2019 | Ross et al. | |
| 2022/0099614 A1 | | 3/2022 | Nauber et al. | |

FOREIGN PATENT DOCUMENTS

| | | | | | |
|---|---|---|---|---|---|
| DE | 19622930 | C2 | 6/1998 | | |
| DE | 19845318 | A1 | 4/2000 | | |
| DE | 19622931 | C2 | 2/2001 | | |
| DE | 10227012 | A1 | 1/2004 | | |
| DE | 102013014994 | A1 | 3/2015 | | |
| DE | 102014007136 | A1 * | 11/2015 | .......... | G01N 27/413 |
| DE | 102016003452 | A1 | 9/2017 | | |
| DE | 102020125411 | A1 | 3/2022 | | |
| EP | 0144057 | A2 | 6/1985 | | |
| EP | 0301897 | A2 | 2/1989 | | |
| EP | 2002251 | B1 | 11/2015 | | |
| EP | 2975390 | A1 | 1/2016 | | |
| JP | 59003345 | A * | 1/1984 | .......... | G01N 27/404 |
| JP | 2005083956 | A | 3/2005 | | |
| JP | 2016164507 | A | 9/2016 | | |

OTHER PUBLICATIONS

EPO machine-generated English langauge translatio of DE 102016003452 A1, patent published Sep. 28, 2017 (Year: 2017).*

Online Encyclopedia Britannica entry for "electric potential", downloaded Jul. 7, 2025 from https://www.britannica.com/science/electric-potential (Year: 2025).*

EPO machine-generated English language translation of Sommer et al. DE 102014007136 A1, patent published Nov. 19, 2015 (Year: 2015).*

* cited by examiner

ELECTROCHEMICAL SENSOR INCLUDING A MEASURING CELL AND AN OXIDATION COMPONENT AND PROCESS USING SUCH A SENSOR

CROSS REFERENCE TO RELATED APPLICATIONS

This application claims the benefit of priority under 35 U.S.C. § 119 of German Application 10 2022 111 351.5, filed May 6, 2022, the entire contents of which are incorporated herein by reference.

TECHNICAL FIELD

The invention relates to an electrochemical sensor with a measuring cell, wherein the measuring cell is capable of detecting a predetermined gas component in a gas and/or is for measuring the concentration of the predetermined gas component, for example oxygen, in the gas. Furthermore, the invention relates to a process in which such a sensor is used.

BACKGROUND

EP 2002251 B1 describes an electrochemical oxygen sensor 1. A housing 12 encloses a chamber in which a measuring cell with a measuring electrode 6, a counter electrode 5, a reference electrode 9 and an electrolyte is arranged. An impermeable insulating element 11 is arranged between the measuring electrode 6 and the counter electrode 5. A gas to be analyzed for oxygen can reach the measuring electrode 6 through a first opening 2. The gas can escape from the chamber again through a second opening 3. Both openings 2 and 3 are arranged on the same side of the housing 12.

SUMMARY

An object of the invention is to provide an electrochemical sensor and a process which are capable of detecting a predetermined gas component in a gas and/or of measuring the concentration of the gas component in the gas and which are less sensitive to environmental influences than known electrochemical sensors and processes.

The object is achieved by an electrochemical sensor having sensor features according to the invention and by a process having process features according to the invention. Advantageous embodiments of the electrochemical sensor according to the invention are, as far as useful, also advantageous embodiments of the process according to the invention and vice versa.

The electrochemical sensor according to the invention comprises a housing. This housing encloses an interior space. A measuring cell side inlet is able to establish, at least temporarily, a fluid communication (fluid connection) between the interior space and an environment of the electrochemical sensor. Furthermore, the interior space is at least temporarily in fluid communication (fluidically connected) with an environment via a pressure equalization outlet. The electrochemical sensor according to the invention further comprises a measuring cell. The measuring cell is arranged between the measuring cell side inlet and the pressure equalization outlet. A gas to be analyzed may pass through the measuring cell side inlet to the measuring cell.

This gas may have at least one predetermined gas component. This gas component is to be detected and is often also referred to as the target gas.

The measuring cell includes
a measuring electrode,
a counter electrode, and
a layer between the two electrodes.

On the one hand, the layer between the two electrodes of the measuring cell is electrically insulating and, in particular, prevents a short circuit between the two electrodes. On the other hand, the layer is ionically conductive, thus allowing ions to flow from one electrode to the other.

A chemical reaction takes place or can take place at or in the measuring cell. This chemical reaction depends on the concentration of the gas component to be detected in the interior. If several gas components to be detected are present in the gas to be analyzed, the chemical reaction usually depends on the summed concentrations of these gas components.

The chemical reaction influences a measurable electrical quantity, for example the current intensity or the electrical charge (summed current intensity) or the electrical voltage. The electrochemical sensor according to the invention further comprises an electrical measuring unit. The electrical measuring unit is capable of measuring an indicator of this influenced or influenceable electrical quantity. An "electrochemical sensor" is understood to be a sensor with such a measuring cell.

Furthermore, the electrochemical sensor comprises an oxidation component. This oxidation component is arranged between the pressure equalization outlet and the measuring cell. A spatial distance occurs between the measuring cell and the oxidation component. The oxidation component is electrically conductive and electrically insulated from the measuring cell. Preferably, at least a portion or part of the oxidation component, for example an electrode, is electrically conductive. Preferably, the oxidation component is ionically conductively connected to the measuring cell.

The oxidation component is capable of oxidizing, ideally completely oxidizing, at least one, preferably every oxidizable (combustible) gas component in the gas, whereby this gas component flows or has flowed through the pressure equalization outlet into the interior, e.g. as part of the gas to be analyzed. Because the gas component is oxidized, it no longer reaches the measuring cell.

The process according to the invention is carried out using an electrochemical sensor according to the invention and comprises the following steps:

A sample of the gas to be investigated flows through the measuring cell side inlet into the interior space, in particular by diffusion and/or suction, and reaches the measuring cell.

A chemical reaction takes place at and/or in the measuring cell. This chemical reaction depends on the concentration of the gas component to be detected in the interior space. The chemical reaction influences a measurable electrical variable.

The electrical measuring unit measures an indicator of this electrical variable.

It is possible for gas to pass through the pressure equalization outlet into the interior space. The oxidation component oxidizes at least one, preferably any, oxidizable gas component, the or each oxidized gas component being part of the gas that passes through the pressure equalization outlet into the interior space.

The measuring unit of the measuring cell measures an indicator of the electrical quantity which is influenced by the chemical reaction in the measuring cell. This chemical reaction is caused and/or maintained by at least one gas component to be detected, which may be present in the gas in the environment to be tested. As a rule, no component of the sensor, in particular no component of the electrical measuring unit, is significantly consumed or used up in the course of an operation. Therefore, it is often not necessary to monitor the level of a substance and to refill this substance if necessary.

In many cases, the measuring cell consumes less electrical energy than a conceivable other design of an electrochemical sensor and of an optional signal processing evaluation unit and an optional display unit. Often, the measuring cell and the measuring unit consume no electrical energy at all, as long as there is no target gas to be detected. The advantage of low energy consumption is particularly relevant when the sensor according to the invention is used as a portable device and comprises its own power supply unit.

Gas to be analyzed can diffuse or otherwise flow through the measuring cell side inlet into the interior space and there to the measuring cell, for example, by being sucked in. The chemical reaction at the measuring cell can lead to an overpressure in the interior space. Thanks to the pressure equalization outlet, this overpressure can be relieved into the environment. As a rule, no fluid conveying unit is required to relieve this overpressure.

However, especially if there is no overpressure in the interior, gas to be analyzed or other gas can also pass through the pressure equalization outlet into the interior. When this gas reaches the measuring cell, i.e. from the other side, it can falsify a measurement of the measuring cell. A major reason for a possible falsification is that the gas changes a reference voltage of the measuring electrode, whereby the influenced electrical quantity depends on this reference voltage. This reference voltage would be distorted in particular if the reference voltage is determined by an optional reference electrode and the gas reaches the reference electrode through the pressure equalization outlet. In particular for this reason, gas under investigation should not reach the measuring cell through the pressure equalization outlet, but only through the measuring cell side inlet. In addition, gas entering the interior through the pressure equalization outlet could lead to unwanted deposits on an electrode of the measuring cell.

The oxidation component according to the invention creates a solution for this problem. The oxidation component is arranged in a fluid communication between the pressure equalization outlet and the measuring cell and oxidizes at least one, preferably all oxidizable components in a gas which flows through the pressure equalization outlet into the interior. In this way, the oxidation component completely or at least largely prevents an oxidizable gas component from reaching the measuring cell from the pressure equalization outlet. On the other hand, the oxidation component ideally has no influence on a gas that flows through the measuring cell side inlet into the interior and reaches the measuring cell.

It is possible, but thanks to the oxidation component not necessary, to close the pressure equalization outlet with a gas-impermeable closure as long as there is no overpressure in the interior, and to remove this closure only to relieve an overpressure. Such a closure could inadvertently be on the pressure equalization outlet even when an overpressure is present and should be relieved. It is possible to close the pressure equalization outlet with a gas-permeable closure, whereby overpressure can be relieved through this closure and whereby this closure protects the interior to a certain degree from mechanical damage from the outside. It is possible to close the pressure equalization outlet with a gas-impermeable closure when the electrochemical sensor is not in use.

According to the invention, the oxidation component is arranged between the pressure equalization outlet and the measuring cell. Because the oxidation component oxidizes oxidizable gas components and is arranged at a distance from the measuring cell, there is less risk of an oxidizable gas component changing a reference voltage of the measuring electrode and thereby falsifying a measurement result, compared to an arrangement without an oxidation component and/or without a distance. The distance makes it possible to arrange at least one barrier layer between the oxidation component and the measuring cell.

A sufficiently high electrical potential can be applied to the oxidation component. This high electrical potential increases the certainty that all oxidizable components in the interior are actually oxidized such that no relevant amount of an oxidizable component can reach the measuring cell. Because the oxidation component works electrically, it is not consumed or at least is consumed and/or used-up more slowly than other possible components which are capable of oxidizing a gas. In particular, it is possible that the oxidation component does not need to have a chemical substance, which is consumed in the course of use.

Because the oxidation component is preferably ionically conductively connected to the measuring cell, the measuring cell is able to determine (fix) an electrical reference potential and/or an electrical reference voltage of the oxidation component.

The oxidation component preferably has an electrical potential that is above the electrical potential of the measuring electrode. This embodiment reliably and quickly prevents an oxidizable gas component, in particular organic vapors, from passing through the pressure equalization outlet to the measuring cell. Instead, this gas component is reliably oxidized by the oxidation component.

In particular, when the sensor according to the invention is used in ambient air, the measuring cell can heat up considerably and could even be damaged if a lot of oxygen reaches the measuring cell. As is known, ambient air has an oxygen content of about 20%. In a preferred embodiment, a volume flow reducer is therefore arranged between measuring cell side inlet and the measuring cell. This volume flow reducer is preferably a mechanical filter and very strongly reduces the volume flow of a gas to the measuring cell, which gas flows through the measuring cell side inlet into the interior, compared to a condition in which no volume flow reducer is arranged between the measuring cell side inlet and the measuring cell. "Very strongly" means: by at least 95%, preferably by at least 99%, particularly preferably by at least 99.9%, especially by at least 99.99%.

The volume flow reducer preferably comprises at least one barrier layer. This barrier layer preferably has a thickness of less than 0.1 mm, particularly preferably less than 20 μm. Thanks to the oxidation component, no such volume flow reducer needs to be arranged between the pressure equalization outlet and the measuring cell. Therefore, a possible overpressure in the interior is reduced faster than if the volume flow through the pressure equalization outlet would also be reduced by a further volume flow reducer.

In a preferred embodiment, the electrochemical sensor comprises a reference electrode. This reference electrode can be denoted as a component of the measuring cell. This reference electrode has a constant electrical potential and thereby determines (fixes) the electrical reference voltage of the measuring electrode. Preferably, the reference electrode is ionically conductively connected to the measuring electrode and thereby determines the electrical potential of the measuring electrode.

Preferably, the oxidation component is located between the reference electrode and the pressure equalization outlet. Particularly preferably, a distance occurs between the reference electrode and the oxidation component. This positioning further reduces the risk of a relevant amount of a combustible gas component reaching the reference electrode through the pressure equalization outlet and changing the reference voltage in an undesirable manner. The spacing allows at least one barrier layer to be provided.

The oxidation component preferably comprises at least one electrode, preferably two electrodes. Preferably, the oxidation component is not only ionically conductively connected to the measuring cell, but also to the reference electrode. In this way, the reference electrode also determines the electrical potential of the or at least one electrode of the oxidation component.

In one implementation, the oxidation component comprises two electrodes and a layer between the two electrodes, this layer on the one hand electrically insulating the two electrodes from one another and on the other hand connecting the two electrodes with each other in an ionically conductive manner. This layer can be constructed in the same way as the layer between the two electrodes of the measuring cell and, in particular, comprise an electrolyte.

The pressure equalization outlet can also be used as an inlet, in particular prior to a deployment of the sensor. Preferably, a liquid electrolyte can flow into the housing and there through the pressure equalization outlet and passing (past) the oxidation component to the measuring cell. This embodiment makes it possible to fill the electrochemical sensor with liquid electrolyte prior to use and, in particular, to ensure that the filled liquid electrolyte reaches the oxidation component and the measuring cell and establishes the required or desired ionically conductive connections. Preferably, the sensor is moved to a position where the measuring cell is vertically or obliquely below the pressure equalization outlet. Force of gravity causes the electrolyte in the interior space to flow vertically or obliquely downward to the measuring cell. Ideally, it is not necessary to refill liquid electrolyte after commissioning the sensor.

In one embodiment, at least one gas-impermeable barrier layer is arranged between the pressure equalization outlet and the measuring cell. At least one gas-permeable passage opening is embedded in the or each barrier layer, optionally at least two gas-permeable passage openings are embedded in a barrier layer. The configuration with the barrier layer further reduces the risk that gas which has flowed through the pressure equalization outlet into the interior reaches the measuring cell. Thanks to the passage opening, pressure equalization can still take place.

According to the invention, a gas from the environment can flow through the measuring cell side inlet into the interior space. In one embodiment, the gas flows from a spatial region directly adjacent to the housing of the electrochemical sensor into the interior, for example by diffusion and/or by suction. In one embodiment, an adapter can be placed on the measuring cell side inlet and preferably removed again. This adapter is connected in a fluid-tight manner to one end of a fluid guiding unit, this fluid guiding unit being arranged outside the electrochemical sensor. With the adapter in place, the measuring cell side inlet is connected to the environment only through the fluid guiding unit. With other words: A gas sample cannot bypass the adapter for entering the interior space. The gas flows through this fluid guiding unit and through the measuring cell side inlet into the interior. Preferably, the adapter does not cover the pressure equalization outlet, so that an overpressure in the interior can be quickly relieved even when the adapter is attached. Preferably, the sensor can be used either with the adapter attached or without the adapter. Preferably, the sensor or also the adapter comprises a fluid conveying unit that is able to draw in a gas through the fluid guiding unit.

A fluid guiding unit is a component that is capable of guiding a fluid along a given trajectory and ideally prevents the fluid from leaving this trajectory. A hose and a tube are two examples of a fluid guiding unit. A fluid conveying unit is capable of causing a flow of fluid. A pump, a fan, and a piston-cylinder unit are three examples of a fluid conveying unit.

The embodiment with the attachable adapter and the fluid guiding unit makes it possible to examine a gas in a spatial region that is spatially distant from the electrochemical sensor. This spaced area can in particular be an enclosed space, and the electrochemical sensor can be arranged outside this space. Substances in the enclosed space can only reach the interior of the sensor through the fluid guiding unit and the measuring cell side inlet, but not through the pressure equalization outlet.

The sensor according to the invention may be configured as a portable device and can have its own power supply unit. A user may carry the sensor according to the invention to investigate a gas in his or her environment. The sensor according to the invention may also be configured as a stationary device and may be connectable to a stationary voltage supply network. Optionally, the sensor according to the invention comprises a fluid conveying unit, such as a pump or fan, which is capable of drawing or sucking in gas from the environment. The sensor according to the invention may comprise its own output unit, which outputs a measurement result of the sensor in a manner that can be perceived by a human. The sensor may comprise a dedicated alarm unit, which outputs an alarm in a human-perceivable manner when a measured value is outside a predetermined range. Preferably, the alarm is output in a tactilely perceptible form, for example by vibrations. It is also possible that the sensor according to the invention comprises a communication unit which is configured to transmit a measurement result or an alarm of the measuring cell to a spatially remote receiver.

In the following, the invention is described based on embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
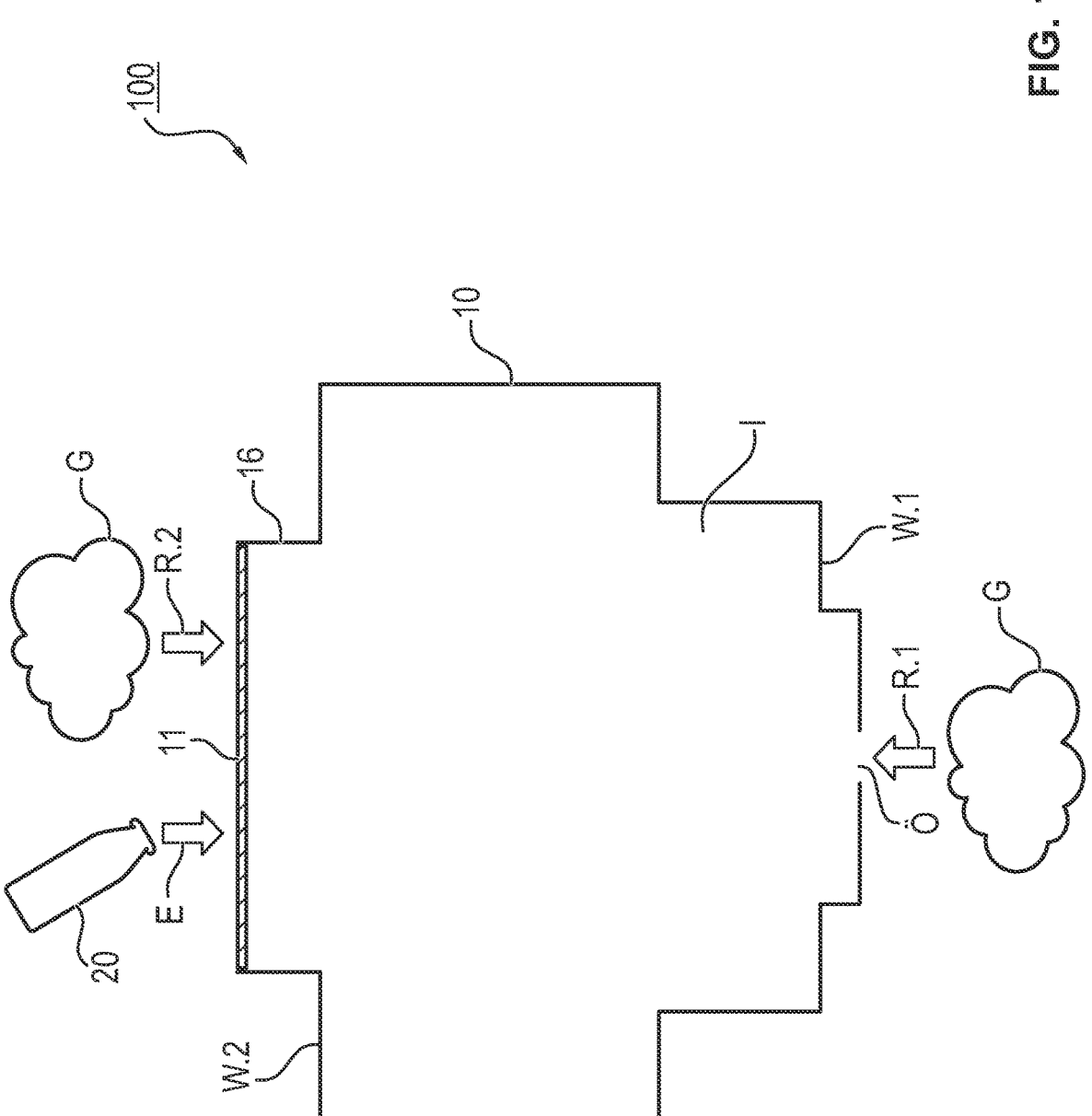
FIG. 1 is a schematic cross-sectional view of how gas can enter the interior of the sensor.

Referring to the drawings, in an embodiment, the sensor according to the invention is used to detect whether or not a gas contains a predetermined gas component, and/or to measure the content (concentration) of this gas component in the gas. The gas component is, for example, oxygen in the form of $O_2$ or a gas mixture containing oxygen, for example $N_2O$ or $H_2O$ or CO, or hydrogen in the form of $H_2$ or organic vapors. In the following description, oxygen is mentioned by way of example as the gas component to be detected. In addition to the oxygen to be detected, oxidizable gas components may be present in the gas to be analyzed, for example $SO_2$, $NO_2$, alcohol, aldehydes and/or unsaturated hydrocarbons.

Figure 2:
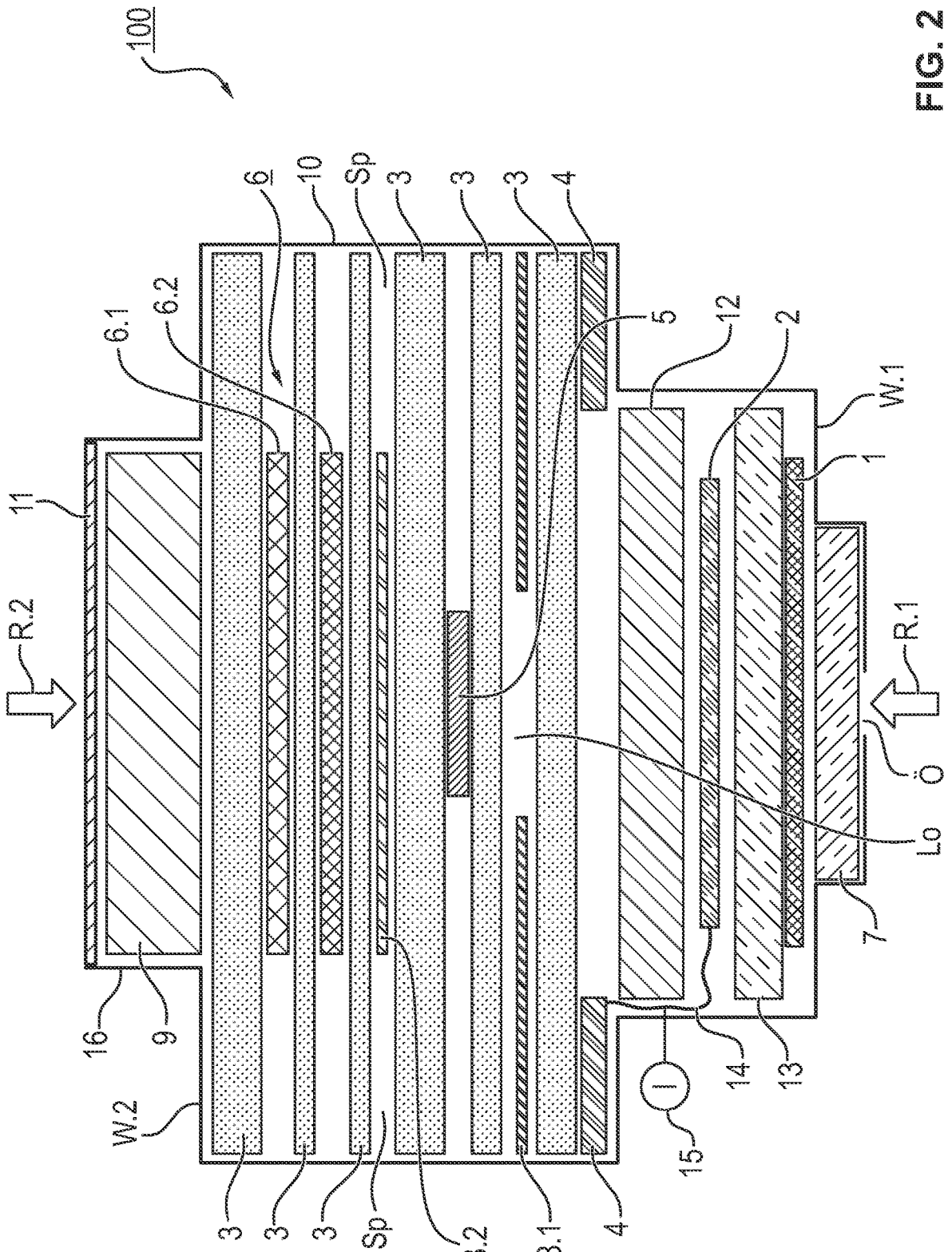
FIG. 2 is a schematic cross-sectional view of the structure of the sensor according to the invention.

FIG. 1 shows schematically in a cross-sectional view how gas G can enter the interior of an electrochemical sensor 100 according to the invention. FIG. 2 schematically shows a cross-sectional view of the sensor 100 according to the invention of FIG. 1.

The sensor 100 includes a housing 10 having a cover 11, the housing 10 surrounding an interior space I. In a plane perpendicular to the drawing planes of FIG. 1 and FIG. 2, the housing 10 preferably has a circular cross-sectional area.

When the sensor 100 is used, a gas G to be examined flows in the direction R.1 through an opening Ö into the interior I, i.e. upward in FIG. 1 and FIG. 2. This opening is hereinafter referred to as the measuring cell side opening and functions as the measuring cell side inlet of the embodiment. The opening is recessed in a wall W.1 of the housing 10.

When the sensor 100 is completed and/or before it is used, a liquid electrolyte E is transferred from a container 20 into the interior I. In the example of FIG. 1, the electrolyte E flows into the interior I from above. The liquid electrolyte E is introduced into the interior I, for example, when the cover 11 is removed or through an opening in the cover 11 which is not shown. An aqueous solution comprising sulfuric acid or phosphoric acid or perchloric acid with a water content of at least 5% is used as the electrolyte E, for example. The boiling point of the liquid electrolyte E is above the temperature at which the sensor 100 is used so that the electrolyte E does not evaporate.

A measuring electrode (working electrode) 2 and a counter electrode 4 are arranged in the interior I, cf. FIG. 2. In the example shown, the measuring electrode 2 is in the form of a disk, and the counter electrode 4 is in the form of a circular ring (torus). In one embodiment, the following chemical reactions take place:

Oxygen on the measuring electrode 2 is reduced to $2O^{2-}$. For example, the chemical reaction $O_2+2H_2\ O+4e^- \rightarrow 4OH^-$ takes place.

$2O^{2-}$, which is contained in the electrolyte E, is oxidized to $O_2$ at the counter electrode 4. For example, the reverse chemical reaction $2H_2\ O \rightarrow O_2+4H^++4e^-$ takes place.

A reference electrode 5 determines (fixes) the electrical potential at the measuring electrode 2. Preferably, the electrical potential of the measuring electrode 2 is several 100 mV lower than that of the reference electrode 5. This causes the chemical reaction at the measuring electrode 2. In particular, the electric potential of the measuring electrode 2 causes the chemical reactions described above. Ideally, the following situation is caused: The concentration of $O_2$ at the measuring electrode 2 is permanently zero due to the chemical reaction. On the other hand, $O_2$ is generated at the counter electrode 4. One realization form of such a measuring cell can be called an "oxygen pump".

An $O_2$ concentration gradient forms between the two electrodes 2 and 4 as a result of the chemical reactions. This $O_2$ gradient causes electrons to flow from the counter electrode 4 to the measuring electrode 2. Therefore, an electric current flows through a wire 14 that connects the measuring electrode 2 to the counter electrode 4 and is arranged with a distance to the electrolyte provided with an insulating layer 12. The electrodes 2 and 4, the electrolyte 12, and the wire 14 together form an electrical circuit. An electrical measuring resistor, which is not shown, is arranged in the wire 14. A measuring unit in the form of a current intensity sensor (amperage sensor) 15 measures the intensity or also the quantity (electric charge) of the current flowing through the wire 14. The current strength or also the electrical charge are a measure of the concentration or content of oxygen in the interior I in the sensor 100.

In the embodiment example, the two electrodes 2 and 4, the insulating layer 12, the wire 14 and the current sensor 15 belong to the measuring cell of the sensor 100.

The distance between the two electrodes 2 and 4 is so great, and the insulating layer 12 with the electrolyte E is so configured, that the following effect is achieved: $O_2$ is largely prevented from diffusing back from the counter electrode 4 to the measuring electrode 2. The electrodes 2 and 4 are made of a metal, preferably a noble metal, which is resistant to materials of the electrolyte E as well as to CO, $H_2$ S and other possible components of the gas G. Particularly preferably, both electrodes 2, 4 are made of platinum or of gold. In this material, the chemical reactions described above take place sufficiently rapidly. On the other hand, this material is chemically resistant to the electrolyte E. It is also possible that the measuring electrode 2 and/or the counter electrode 4 are made of gold.

The two electrodes 2, 4 are electrically insulated from each other by an insulating layer 12 with at least one layer of glass fiber or a glass nonwoven, which is impregnated with the electrolyte E. At the same time, the electrolyte E enables the flow of ions.

The cover 11 is mounted on a support sleeve 16, which is mechanically connected to a wall W.2 of the housing 10. The area enclosed by this support sleeve 16 functions as the pressure equalization outlet of the embodiment. Inside this supporting sleeve 16, an elastic gas-permeable seal (plug) 9 is arranged. This seal 9 presses the electrodes and other layers together and causes the electrodes to be able to perform only a relatively small relative movement with respect to each other, and therefore the wire 14 permanently and reliably contacts the two electrodes 2 and 4.

As is well known, air has an oxygen content of about 20%. Such a large amount of oxygen would lead to a large turnover of oxygen at the measuring electrode 2 and quickly damage the measuring electrode 2. Therefore, a volume flow reducer in the form of a thin barrier layer 1 separates the measuring electrode 2 from the environment in a nearly fluid-tight manner. "Nearly fluid-tight" in the embodiment example means that less than 1%, in particular less than 1‰, preferably less than 0.1‰, of the gas G flowing from the environment in the direction R.1 through the opening Ö into the interior I can penetrate the barrier layer 1 and reach the measuring electrode 2. This small amount is sufficient for the measured current or electric charge through the wire 14 to correlate with sufficient reliability with the sought oxygen concentration.

In the embodiment example, the barrier layer 1 has a thickness of at least 5 μm and less than 50 μm, preferably less than 20 μm, particularly preferably a thickness between 10 μm and 15 μm. It is desired to prevent a crack or hole from appearing in the barrier layer 1. In the example shown, the barrier layer 1 is arranged in the manner of a sandwich between two supporting membranes 7 and 13. Each supporting membrane 7, 13 is formed of PTFE, for example. The supporting membrane 7 between the opening Ö and the barrier layer 1 protects the barrier layer 1 from mechanical damage due to influences acting from the outside through the opening Ö. The supporting membrane 13 between the barrier layer 1 and the measuring electrode 2 protects the barrier layer 1 from possible mechanical damage caused by the wire 14.

Viewed in the direction of flow R.1, the reference electrode 5 is arranged downstream from the counter electrode 4. This reference electrode 5 provides a reference electrical potential and prevents the current intensity or the electrical charge measured by the current intensity sensor 15 from drifting or oscillating while the oxygen concentration remains constant. Because the reference electrode 5 is located a sufficiently large distance downstream from both electrodes 2 and 4, the reference electrode 5 is outside the region where the $O_2$ concentration gradient described above occurs. Therefore, this $O_2$ gradient does not affect the reference electrode 5 and, ideally, does not affect the reference voltage that defines the reference electrode 5.

Several parallel insulating layers 3 are arranged in the interior I, which layers are impregnated with the electrolyte E and comprise, for example, glass fleece (glass nonwoven). Through the insulating layer 3, the electrolyte E reaches the insulating layer 12 and wets the surface of the measuring electrode 2. Because the counter electrode 4 has the shape of a circular ring, the electrolyte E can flow through the hole in the circular ring to the measuring electrode 2. The membrane 13 between the measuring electrode 2 and the barrier layer 1 prevents the electrolyte E from flowing further in the direction of the barrier layer 1.

In one embodiment, the reference electrode 5 is surrounded on both sides by an insulating layer 3 with electrolyte E in the manner of a sandwich. At least one insulating layer 3 is arranged between the reference electrode 5 and the counter electrode 4, in the example shown two insulating layers 3 are so arranged. As a result, the reference electrode 5 is electrically insulated from the counter electrode 4 but ionically conductively connected. Due to the distance described above and this electrical insulation, the reference electrode 5 is not influenced in any significant way by the $O_2$ gradient between the two electrodes 2 and 4. The undesirable effect is largely prevented because the insulating layers 3 have an electrically insulating effect and because oxygen diffuses relatively slowly.

An overpressure can occur in the interior I as a result of a chemical reaction, in particular one of the reactions just described at the measuring cell. This overpressure must be relieved quickly, in particular because the overpressure can cause oxygen in the electrolyte E to dissolve and diffuse to the measuring electrode 2, which can result in incorrect measurement results. Therefore, in one embodiment, the optional cover 11 is gas-permeable or permanently has an opening. The seal 9 is also gas permeable. The cover 11 protects the seal 9 from mechanical damage from the outside. The overpressure in the interior I can therefore be relieved through the seal 9 and the cover 11. The seal 9 and the cover 11 are arranged in or on the pressure equalization outlet 16 of the embodiment.

As explained above, oxygen in the form of $O_2$ is generated at the counter electrode 4. The barrier layer 12 with the electrolyte E prevents the undesirable event of this oxygen reaching the measuring electrode 2. In particular, thanks to the oxygen generated at the counter electrode 4 not being able to penetrate the barrier layer 12, an overpressure occurs in the region between the counter electrode 4 and the cover 11. In the embodiment example, the counter electrode 4 is configured as a ring, and a gap occurs between the reference electrode 5 and the housing 10. This implementation form facilitates the desired result that this overpressure is relieved in the direction R.1 through the pressure equalization outlet 16, i.e. upward in FIG. 1 and FIG. 2.

With the cover 11 removed or through the cover 11 or through an opening in the cover 11 and through the elastic seal 9, gas G can flow from the environment in the direction R.2, i.e. downwards in FIG. 1 and FIG. 2, and thereby get into the interior I. This applies in particular when there is no overpressure in the interior I relative to the environment. This gas G can have at least one oxidizable gas component which can shift the reference potential of the reference electrode 5 or which can lead to deposits on an electrode 2, 4, 5. Examples of such oxidizable gas components were mentioned above.

An oxidation component 6 is arranged between the seal 9 on the one hand and the electrodes 5, 4, 2 on the other. This oxidation component 6 largely prevents oxidizable gas components which have flowed through the pressure equalization outlet 16 into the interior I from reaching an electrode 5, 4, 2. The oxidation component 6 comprises at least one electrode, in the example shown two electrodes 6.1 and 6.2 spaced apart from each other. In one embodiment, the oxidation component 6 comprises two electrodes 6.1, 6.2 just like the measuring cell, as well as an ionically conductive connection between the electrodes 6.1 and 6.2, for example a layer 3 saturated with the electrolyte E. An $O_2$ gradient also occurs between these two electrodes 6.1 and 6.2.

Preferably, the or each electrode 6.1, 6.2 of the oxidation component 6 is made of platinum or gold. The or at least one electrode 6.1, 6.2 of the oxidation component 6 is held at an electrical potential that differs from the electrical potential of the reference electrode 5 and is between 0.1 V and 0.5 V, preferably between 0.2 V and 0.4 V. The oxidation component 6 therefore oxidizes all oxidizable components of the gas G which diffuse through the cover 11 and the seal 9 in the direction R.2 into the interior I, and ideally completely.

At least one insulating layer 3 electrically insulates the oxidation component 6 from the reference electrode 5, in the example shown two insulating layers 3 spaced apart from each other. The oxidation component 6 is ionically conductively connected to the reference electrode 5, in the embodiment example by the electrolyte E in the insulating layer 3. Thanks to the ionically conductive connection, the reference electrode 5 additionally determines the electrical potential of the oxidation component 6 or at least the electrical potential of an electrode 6.1 or 6.2 of the oxidation component 6.

Optionally, two gas-impermeable barrier foils 8.1 and 8.2 are arranged between the oxidation component 6 and the counter electrode 4. The two barrier foils 8.1 and 8.2 are made, for example, of a plastic that is impermeable to gas, such as a perfluoroalkoxy polymer (PFA) or a polyvinylidene fluoride (PVDF). The barrier foils 8.1 and 8.2 reduce the risk of $O_2$ diffusing from the counter electrode 4 to the reference electrode 5 or even to the oxidation component 6, or of a gas flowing in the direction R.2 reaching an electrode 2, 4. The two barrier foils 8.1 and 8.2 are resistant to the electrolyte E. In order that the electrolyte E can nevertheless reach the measuring electrode 2, a sufficiently large gap Sp occurs between the barrier foil 8.2 and the housing 10. The barrier foil 8.1 has the shape of a ring (torus) so that the electrolyte E can flow through the hole Lo in this ring to the measuring electrode 2.

Figure 3:
FIG. 3 is a schematic view, corresponding to the cross-sectional view of FIG. 1, showing an adapter and a hose on the measuring cell side inlet.

In the embodiment shown in FIG. 1, the gas G diffuses into the interior I from a spatial region immediately adjacent to the opening Ö. FIG. 3 shows an alternative configuration. An adapter 30 is placed on the opening Ö. The adapter 30 is fluid-tightly connected to a hose 31. The gas G can only reach the opening Ö through the hose 31, but not by bypassing the adapter 30. Apart from the hose 31, the adapter 30 surrounds the opening Ö in a fluid-tight manner. The free end of the hose 31 is located in an area with gas to be investigated. A schematically shown pump 32 sucks the gas G through the hose 31 and directs it further through the opening Ö into the interior I. Just like an embodiment of FIG. 1, gas G can also reach the interior I through the pressure equalization outlet 16.

The adapter 30 can again be removed from the opening Ö so that the gas G then again reaches the interior I directly through the opening Ö, as indicated in FIG. 1.

While specific embodiments of the invention have been shown and described in detail to illustrate the application of the principles of the invention, it will be understood that the invention may be embodied otherwise without departing from such principles.

| List of reference characters | |
|---|---|
| 1 | Inlet-side barrier layer, arranged between the supporting diaphragms 7 and 13, acts as a volume flow reducer for the orifice Ö |
| 2 | Measuring electrode, belongs to the measuring cell |
| 3 | Insulating layer impregnated with electrolyte E |
| 4 | Annular counter electrode, belongs to the measuring cell |
| 5 | Reference electrode, belongs to the measuring cell |
| 6 | Oxidation component, comprises at least one electrode, preferably the two electrodes 6.1 and 6.2, arranged between the pressure equalization outlet 16 and the measuring cell |
| 6.1, 6.2 | Electrodes of the oxidation component 6 |
| 7 | Gas-permeable supporting membrane between the barrier layer 1 and the opening Ö |
| 8.1 | Annular barrier foil between the reference electrode 5 and the measuring electrode 2, has the hole Lo |
| 8.2 | Disc-shaped barrier foil between the oxidation component 6 and the reference electrode 5, 5, surrounded by the annular gap Sp |
| 9 | Elastic seal (plug) between the oxidation component 6 and the cover 11 11 in the support sleeve 16 |
| 10 | Housing, encloses the interior I, includes the opening Ö on the measuring cell side, is mechanically connected to the support sleeve 16, accommodates, among other things, the measuring cell, and the oxidation component 6 |
| 11 | Cover for the housing 10 |
| 12 | Insulating layer with electrolyte between electrodes 2 and 4 of the measuring cell |
| 13 | Gas-permeable supporting membrane between the barrier layer 1 and the measuring electrode 2 |
| 14 | Wire electrically connecting electrodes 2 and 4 with each other |
| 15 | Current intensity sensor, measures the current intensity or the electric charge of the current flowing through the wire 14 |
| 16 | Support sleeve around the elastic seal 9, is mechanically connected to the wall W.2 of the housing 10, receives the seal 9, can be closed by the cover 11, acts as a pressure equalization outlet |
| 20 | Container for filling the electrolyte E |
| 30 | Adapter that can be detachably placed on the opening Ö |
| 31 | Hose connected to the adapter 30 |
| 32 | Pump sucking the gas G through the hose 31 |
| 100 | Sensor, includes electrodes 2, 4, 5, 6, housing 10, barrier layers 3, barrier foils 8.1 and 8.2, seal 9 and cover 11 |
| E | Liquid electrolyte, is filled from the container 20 from above into the sensor 100 |
| G | Gas to be investigated, can flow into the interior I in the directions R.1 and R.2 |
| I | Interior of the sensor 100, enclosed by the housing 10 |
| Lo | Hole in the annular barrier foil 8.1 |
| Ö | Opening through which gas G diffuses through the barrier layer 1 into the interior I acts as a measuring cell side inlet |
| R.1 | Direction in which gas G to be tested flows through opening Ö into interior I |
| R.2 | Direction in which gas G to be investigated flows through the support sleeve 16 into the interior I is opposite to the direction R.1 |
| Sp | Gap between the barrier film 8.2 and the housing 10 |
| W.1 | Wall of the housing 10 in which the inlet Ö on the measuring cell side is recessed |
| W.2 | Wall of the housing 10 to which the support sleeve 16 is connected |

What is claimed is:

1. An electrochemical sensor for detecting a predetermined gas component in a gas and/or for measuring a concentration of the gas component in the gas, the electrochemical sensor comprising:
   a housing enclosing an interior space;
   a measuring cell side inlet in the housing, the measuring cell side inlet being configured to provide fluid communication between the interior space and an environment of the electrochemical sensor;
   a pressure equalization outlet in the housing, the pressure equalization outlet being configured to provide fluid communication between the interior space and an environment of the electrochemical sensor;
   a measuring cell in the interior space, the measuring cell being arranged between the measuring cell side inlet and the pressure equalization outlet and configured such that a chemical reaction takes place at the measuring cell which reaction depends on the concentration of the gas component in the interior space and influences a measurable electrical variable, the measuring cell comprising:
      a measuring electrode;
      a counter electrode; and
      an electrically insulating and ionically conductive layer between the measuring electrode and the counter electrode;
   an electrical measuring unit configured to measure an indicator of the influenced electrical variable; and
   an oxidation component arranged in the interior space between the pressure equalization outlet and the measuring cell and at a distance from the measuring cell, the oxidation component being electrically isolated from the measuring cell and being arranged and configured to oxidize an oxidizable component in the gas passing from outside the housing through the pressure equalization outlet into the interior space.

2. An electrochemical sensor according to claim 1, wherein the measuring electrode has an electrical potential and at least a portion of the oxidation component is electrically conductive and has an electrical potential that is above the electrical potential of the measuring electrode, the oxidation component comprising at least one electrode arranged between the pressure equalization outlet and the measuring cell.

3. An electrochemical sensor according to claim 1, further comprising a volume flow reducer between the measuring cell side inlet and the measuring cell, wherein the volume flow reducer is configured to reduce a volume flow from the environment through the measuring cell side inlet to the measuring cell compared to a state without the volume flow reducer.

4. An electrochemical sensor according to claim 3, wherein the volume flow reducer is configured to reduce a volume flow from the environment through the measuring cell side inlet to the measuring cell compared to a state without the volume flow reducer by at least 95%.

5. An electrochemical sensor according to claim 3, wherein the volume flow reducer is configured to reduce a volume flow from the environment through the measuring cell side inlet to the measuring cell compared to a state without the volume flow reducer by at least 99%.

6. An electrochemical sensor according to claim 3, wherein the volume flow reducer is configured to reduce a volume flow from the environment through the measuring cell side inlet to the measuring cell compared to a state without the volume flow reducer by at least 99.99%.

7. An electrochemical sensor according to claim 1, further comprising a reference electrode which has a constant electrical potential, wherein the oxidation component is arranged between the reference electrode and the pressure equalization outlet and is ionically conductively connected to the reference electrode.

8. An electrochemical sensor according to claim 1, wherein the electrochemical sensor is configured such that a liquid electrolyte can flow from the pressure equalization outlet past the oxidation component to the measuring cell.

9. An electrochemical sensor according to claim 1, further comprising a gas-impermeable barrier layer arranged between the pressure equalization outlet and the measuring cell, wherein the gas-impermeable barrier layer has at least one passage opening permeable to gas.

10. An electrochemical sensor according to claim 1, wherein:
   the measuring cell side inlet and the pressure equalization outlet are recessed in two opposite walls of the housing; and
   the measuring cell and the oxidation component are arranged between the two opposite walls.

11. An electrochemical sensor according to claim 1, wherein the oxidation component is ionically conductively connected to the measuring cell.

12. An electrochemical sensor according to claim 1, wherein the oxidation component is arranged and configured to oxidize any oxidizable component in the gas passing through the pressure equalization outlet into the interior space.

13. An arrangement comprising:
   an electrochemical sensor for detecting a predetermined gas component in a gas and/or for measuring a concentration of the gas component in the gas, the electrochemical sensor comprising:
      a housing enclosing an interior space;
      a measuring cell side inlet in the housing, the measuring cell side inlet being configured to provide fluid communication between the interior space and an environment of the electrochemical sensor;
      a pressure equalization outlet in the housing, the pressure equalization outlet being configured to provide fluid communication between the interior space and an environment of the electrochemical sensor;
      a measuring cell in the interior space, the measuring cell arranged between the measuring cell side inlet and the pressure equalization outlet and configured such that a chemical reaction takes place at the measuring cell which depends on the concentration of the gas component in the interior space and influences a measurable electrical variable, the measuring cell comprising:
         a measuring electrode;
         a counter electrode; and
         an electrically insulating and ionically conductive layer between the measuring electrode and the counter electrode;
      an electrical measuring unit configured to measure an indicator of the influenced electrical variable; and
      an oxidation component arranged in the interior space between the pressure equalization outlet and the measuring cell and at a distance from the measuring cell, the oxidation component being electrically isolated from the measuring cell and being arranged and configured to oxidize an oxidizable component in the gas passing from outside the housing through the pressure equalization outlet into the interior space;

an adapter configured to be detachably mounted on the housing; and a fluid guiding unit fluid-tightly connected to the adapter, wherein with the adapter mounted on the housing, the measuring cell side inlet is in fluid communication with an environment of the electrochemical sensor only through the fluid guiding unit.

14. An arrangement according to claim 13, wherein the measuring electrode has an electrical potential and at least a portion of the oxidation component is electrically conductive and has an electrical potential that is above the electrical potential of the measuring electrode, the oxidation component comprising at least one electrode arranged between the pressure equalization outlet and the measuring cell.

15. An arrangement according to claim 13, further comprising a volume flow reducer between the measuring cell side inlet and the measuring cell, wherein the volume flow reducer is configured to reduce a volume flow from the environment through the measuring cell side inlet to the measuring cell compared to a state without the volume flow reducer.

16. An arrangement according to claim 13, further comprising a reference electrode which has a constant electrical potential, wherein the oxidation component is arranged between the reference electrode and the pressure equalization outlet and is ionically conductively connected to the reference electrode.

17. An arrangement according to claim 13, wherein the electrochemical sensor is configured such that a liquid electrolyte can flow from the pressure equalization outlet past the oxidation component to the measuring cell.

18. A process for detecting a predetermined gas component in a gas and/or for measuring a concentration of the gas component in the gas, the process comprising the steps of:

providing an electrochemical sensor comprising a housing enclosing an interior space; a measuring cell side inlet in the housing; a pressure equalization outlet in the housing; a measuring cell arranged in the interior space between the measuring cell side inlet and the pressure equalization outlet, the measuring cell comprising: a measuring electrode; a counter electrode; and an electrically insulating and ionically conductive layer between the two electrodes; an electrical measuring unit; and an oxidation component in the interior space between the pressure equalization outlet and the measuring cell and at a distance from the measuring cell, wherein the oxidation component is electrically conductive and is electrically isolated from the measuring cell, wherein both the measuring cell side inlet and the pressure equalization outlet at least temporarily provide fluid communication between the interior space and an environment of the electrochemical sensor;

allowing a sample of the gas to flow through the measuring cell side inlet into the interior space and to reach the measuring cell;

allowing a chemical reaction to take place at the measuring cell which reaction depends on the concentration of the gas component in the interior space and influences a measurable electrical variable;

measuring an indicator of the influenced electrical variable with the electrical measuring unit; and oxidizing an oxidizable component in the gas passing from outside the housing through the pressure equalization outlet into the interior space with the oxidation component.

19. A process according to claim 18, wherein the oxidation component is ionically conductively connected to the measuring cell.

20. A process according to claim 18, wherein the oxidation component is arranged and configured to oxidize any oxidizable component in the gas passing through the pressure equalization outlet into the interior space, the oxidation component comprising at least one electrode arranged between the pressure equalization outlet and the measuring cell.

* * * * *